(12) United States Patent
Brackin et al.

(10) Patent No.: US 9,637,979 B2
(45) Date of Patent: May 2, 2017

(54) ROTARY DRAG BITS INCLUDING ABRASIVE-IMPREGNATED CUTTING STRUCTURES

(71) Applicant: Baker Hughes Incorporated, Houston, TX (US)

(72) Inventors: Van J. Brackin, Spring, TX (US); Jeffrey B. Lund, Cottonwood Heights, UT (US); Danny E. Scott, Montgomery, TX (US); Marcus R. Skeem, Sandy, UT (US); Matthew R. Isbell, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 543 days.

(21) Appl. No.: 14/173,499

(22) Filed: Feb. 5, 2014

(65) Prior Publication Data

US 2014/0151132 A1 Jun. 5, 2014

Related U.S. Application Data

(63) Continuation of application No. 13/719,127, filed on Dec. 18, 2012, now Pat. No. 8,662,207, which is a continuation of application No. 12/396,556, filed on Mar. 3, 2009, now Pat. No. 8,333,814, which is a continuation of application No. 11/044,782, filed on Jan. 27, 2005, now Pat. No. 7,497,280.

(51) Int. Cl.
*E21B 10/46* (2006.01)
*E21B 10/54* (2006.01)

(52) U.S. Cl.
CPC .............. *E21B 10/54* (2013.01); *E21B 10/46* (2013.01)

(58) Field of Classification Search
CPC ......... E21B 10/006; E21B 10/46; E21B 10/54
See application file for complete search history.

(56) References Cited

U.S. PATENT DOCUMENTS

| | | |
|---|---|---|
| 2,371,489 A | 3/1945 | Williams, Jr. |
| 2,846,193 A | 8/1958 | Chadderson |
| 3,106,973 A | 10/1963 | Christensen |
| 3,131,779 A | 5/1964 | Rowley et al. |
| 3,709,308 A | 1/1973 | Rowley et al. |
| 3,825,083 A * | 7/1974 | Flarity ................... E21B 10/46 175/325.2 |
| 4,128,136 A | 12/1978 | Generoux |
| 4,234,048 A | 11/1980 | Rowley |
| 4,244,432 A | 1/1981 | Rowley et al. |

(Continued)

FOREIGN PATENT DOCUMENTS

| | | |
|---|---|---|
| EP | 111600 A1 | 6/1984 |
| EP | 196777 A1 | 3/1991 |

(Continued)

*Primary Examiner* — Giovanna C Wright
(74) *Attorney, Agent, or Firm* — TraskBritt

(57) ABSTRACT

Rotary drag bits comprise a body comprising a face at a leading end of the body. An abrasive-impregnated cutting structure is located at the face of the body. The abrasive-impregnated cutting structure comprises abrasive particles dispersed within a matrix material. The abrasive-impregnated cutting structure exhibits an anisotropic wear resistance. The wear resistance varies at least substantially continuously within the abrasive-impregnated cutting structure.

22 Claims, 11 Drawing Sheets

(56) References Cited

U.S. PATENT DOCUMENTS

| | | | |
|---|---|---|---|
| 4,368,788 | A | 1/1983 | Drake et al. |
| 4,726,432 | A | 2/1988 | Scott et al. |
| 4,991,670 | A | 2/1991 | Fuller et al. |
| 5,011,514 | A | 4/1991 | Cho et al. |
| 5,024,680 | A | 6/1991 | Chen et al. |
| RE33,757 | E | 12/1991 | Weaver |
| 5,224,969 | A | 7/1993 | Chen |
| 5,238,074 | A | 8/1993 | Tibbitts |
| 5,433,280 | A | 7/1995 | Smith |
| 5,641,921 | A | 6/1997 | Dennis et al. |
| 5,755,299 | A | 5/1998 | Langford et al. |
| 5,935,323 | A | 8/1999 | Tanga et al. |
| 6,095,265 | A | 8/2000 | Alsup |
| 6,102,140 | A | 8/2000 | Boyce et al. |
| 6,170,583 | B1 | 1/2001 | Boyce |
| 6,202,770 | B1 | 3/2001 | Jurewicz et al. |
| 6,394,202 | B2 | 5/2002 | Truax et al. |
| 6,458,471 | B2 | 10/2002 | Lovato et al. |
| 6,510,906 | B1 | 1/2003 | Richert et al. |
| 6,601,662 | B2 | 8/2003 | Matthias et al. |
| 6,640,913 | B2 | 11/2003 | Lockstedt et al. |
| 6,742,611 | B1 | 6/2004 | Illerhaus et al. |
| 7,497,280 | B2 | 3/2009 | Brackin et al. |
| 8,333,814 | B2 | 12/2012 | Brackin et al. |
| 2002/0100620 | A1 | 8/2002 | Singh et al. |
| 2013/0105230 | A1 | 5/2013 | Brackin et al. |

FOREIGN PATENT DOCUMENTS

| | | |
|---|---|---|
| GB | 2328233 A | 2/1999 |
| WO | 0015942 | 3/2000 |
| WO | 2004103641 A1 | 12/2004 |

\* cited by examiner

ROTARY DRAG BITS INCLUDING ABRASIVE-IMPREGNATED CUTTING STRUCTURES

CROSS-REFERENCE TO RELATED APPLICATIONS

This application is a continuation of U.S. patent application Ser. No. 13/719,127, filed Dec. 18, 2012, now U.S. Pat. No. 8,662,207, issued Mar. 4, 2014, which is a continuation of U.S. patent application Ser. No. 12/396,556, filed Mar. 3, 2009, now U.S. Pat. No. 8,333,814, issued Dec. 18, 2012, which is a continuation of U.S. patent application Ser. No. 11/044,782, filed Jan. 27, 2005, now U.S. Pat. No. 7,497,280, issued Mar. 3, 2009, the disclosure of each of which is incorporated herein by reference in its entirety.

BACKGROUND OF THE INVENTION

Field of the Invention

The present invention relates to fixed cutter or drag type bits for drilling subterranean formations. More specifically, the present invention relates to impregnated drag bits for drilling rock formations.

State of the Art

So-called "impregnated" drag bits have been used conventionally for drilling rock formations that are hard, abrasive, or both. More particularly, conventional earth boring drag bits with diamond-impregnated cutting structures, commonly termed "segments," or, alternatively, discrete diamond-impregnated cutting structures have been employed to bore through very hard and abrasive formations, such as basalt, dolomite, and hard sandstone. These conventional impregnated drag bits typically employ a cutting face comprising a diamond-impregnated material, which refers to an abrasive particle or material, such as natural or synthetic diamond grit, uniformly dispersed within a matrix of surrounding material. As a conventional impregnated drag bit drills, the matrix wears to expose the abrasive particles, the abrasive particles also wear, and worn abrasive particles may be lost and new abrasive particles, which were previously surrounded by matrix material, may be exposed.

In fact, many conventional diamond impregnated segments may be designed to release, or "shed," such diamonds or grit in a controlled manner during use of the drag bit. As a layer of diamonds or grit is shed from the face, underlying diamonds are exposed as abrasive cuttings and the diamonds that have been shed from the drag bit wear away the exposed continuous phase of the segment in which the interior diamonds are substantially uniformly dispersed until the entire diamond-impregnated portion of the bit has been consumed. Thus, drag bits with diamond-impregnated segments may maintain a substantially constant boring rate or rate of penetration, assuming a homogeneous formation, as long as diamonds remain exposed on such segments.

Regarding conventional abrasive-impregnated cutting structures, the abrasive material with which the continuous matrix material is impregnated preferably comprises a hard, abrasive and abrasion-resistant particulate material, and most preferably a super-abrasive material, such as natural diamond, synthetic diamond, or cubic boron nitride.

The impregnated segment may include more than one type of abrasive material, as well as one or more sizes or quality grades of abrasive material particles. In conventional abrasive-impregnated cutting structures, the abrasive is substantially homogeneously distributed (i.e., not segregated) within the continuous matrix material. The continuous matrix material may be chosen for wettability to the abrasive particles, mechanical properties, such as abrasion resistance, or both, and may comprise one or more of copper, a copper-based alloy, nickel, a nickel-based alloy, cobalt, a cobalt-based alloy, iron, an iron-based alloy, silver, or a silver-based alloy.

Two general approaches are conventionally employed to fabricate drag bits having abrasive-impregnated cutting structures.

In a first approach, an abrasive-impregnated cutting structure may be cast integrally with the body of a drag bit, as by low-pressure infiltration. For instance, one conventional abrasive-impregnated cutting structure configuration includes placing abrasive material into a mold (usually mixed with a molten wax) as by hand-packing, as known in the art. Subsequently, the mold may be filled with other powders and a steel core and the entire assembly heated sufficiently to allow for a hardenable infiltrant, such as a molten alloy of copper or tin to infiltrate the powders and abrasive material. The result, upon the infiltrant cooling and hardening, is a bit body, which has abrasive-impregnated cutting structures bonded thereto by the continuous matrix of the infiltrant.

In a second approach, the abrasive-impregnated cutting structures may be preformed or fabricated separately, as in hot isostatic pressure infiltration, and then brazed or welded to the body of a drag bit. Thus, conventional abrasive-impregnated cutting structures may be formed as so-called "segments" by hot-pressing, infiltration, or the like, which may be brazed or otherwise held into a bit body after the bit body is fabricated. Such a configuration allows for the bit body to include infiltrants with higher melting temperatures and to avoid damage to the abrasive material within the abrasive-impregnated cutting structures that would occur if subjected to the higher temperatures.

As known in the art, diamond impregnated segments of drag bits may be typically secured to the boring end, which is typically termed the "face," of the bit body of the drag bit, oriented in a generally radial fashion. Impregnated segments may also be disposed concentrically or spirally over the face of the drag bit. As the drag bit gradually grinds through a very hard and abrasive formation, the outermost layer of the impregnated segments containing abrasive particles wear and may fracture, as described above. For instance, U.S. Pat. No. 4,234,048 (the "'048 patent"), which issued to David S. Rowley on Nov. 18, 1980, discloses an exemplary drag bit that bears diamond-impregnated segments on the crown thereof. Typically, the impregnated segments of such drag bits are C-shaped or hemispherically shaped, somewhat flat, and arranged somewhat radially around the crown of the drag bit. Each impregnated segment typically extends from the inner cone of the drag bit, radially outwardly therefrom and up the bit face to the gage. The impregnated segments may be attached directly to the drag bit during infiltration, or partially disposed within a slot or channel formed into the crown and secured to the drag bit by brazing.

Alternatively, conventional discrete, post-like cutting structures are disclosed in U.S. Pat. Nos. 6,458,471 and 6,510,906, both of which are assigned to the assignee of the present invention and each of the disclosures of which are incorporated, in their entirety, by reference herein.

U.S. Pat. No. 3,106,973 issued to Christensen on Oct. 15, 1963, discloses a drag bit provided with circumferentially and radially grooves having cutter blades secured therein. The cutter blades have diamond impregnated sections formed of a matrix of preselected materials.

U.S. Pat. No. 4,128,136 issued to Generoux on Dec. 5, 1978, discloses a diamond coring bit having an annular crown and inner and outer concentric side surfaces. The inner concentric side surface of the crown defines a hollow core in the annular crown of the bit for accommodating a core sample of a subterranean formation. The annular crown is formed from a plurality of radially oriented composite segments impregnated with diamonds radially and circumferentially spaced apart from each other by less abrasive spacer materials.

U.S. Pat. No. 6,095,265 to Alsup discloses an adaptive matrix including two or more different abrasive compositions in alternating ribs or in staggered alternating zones of each rib to establish different diamond exposure in specified areas of the bit face. Alsup further discloses that the abrasive compositions for adaptive matrix bits contain diamond and/or other super-hard materials within a supporting material. The supporting material may include a particulate phase of tungsten carbide and/or other hard compounds, and a metallic binder phase of copper or other primarily non-ferrous alloys. Alsup discloses that the properties of the resulting metal-matrix composite material depend on both the percentage of each component and the processing that combines the components. Further, Alsup discloses that the size and type of the diamonds, carbide particles, binder alloy or other components can also be used to effect changes in the overall abrasive or erosive wear properties of the abrasive composition. Additionally, such adjacent "hard" and "soft" ribs may purportedly facilitate fluid cleaning in and around the ribs.

U.S. Pat. No. 6,458,471 to Lovato et al., assigned to the assignee of the present invention and the disclosure of which is incorporated herein in its entirety by reference thereto, discloses cutting elements including an abrasive-impregnated cutting structure having an associated support member, wherein the support member is securable to an earth boring rotary-type drag bit body and provides mechanical support to the cutting structure.

U.S. Pat. No. 6,742,611 to Illerhaus et al., assigned to the assignee of the present invention and the disclosure of which is incorporated herein in its entirety by reference thereto, discloses a first cutting element segment formed of a continuous-phase solid matrix material impregnated with at least one particulate superabrasive material, the first cutting element segment juxtapositioned with at least one second cutting element segment formed of a continuous-phase solid matrix material to form a laminated cutting element. Preferably, the at least one second cutting element segment is essentially devoid of impregnated superabrasive or abrasive particles. Alternatively, the at least one second cutting element segment can be impregnated with a preselected, secondary, particulate superabrasive material that results in the at least one second segment being less abrasive and less wear resistant than the at least one first abrasive segment.

While the above-discussed conventional abrasive-impregnated cutting structures and drag bits may perform as intended, it may be appreciated that improved abrasive-impregnated cutting structures and drag bits would be desirable. Further, it would be desirable to improve abrasive-impregnated cutting structures that exhibit selectable wear characteristics.

BRIEF SUMMARY OF THE INVENTION

The present invention relates to an abrasive-impregnated cutting structure for use in drilling a subterranean formation. More specifically, the abrasive-impregnated cutting structure may comprise a plurality of abrasive particles dispersed within a substantially continuous matrix, wherein the abrasive-impregnated cutting structure exhibits an anisotropic wear resistance. One or more of the amount, average size, composition, strength, properties, shape, quality, and concentration of the abrasive particles may vary within the abrasive-impregnated cutting structure. Of course, the abrasive particles may comprise one or more material or composition, without limitation. In addition, one or more properties of the substantially continuous matrix material may vary within the abrasive-impregnated cutting structure.

Further, the anisotropic wear resistance may relate to a selected direction. For example, anisotropic wear resistance may relate to an expected direction of engagement of the abrasive-impregnated cutting structure with the subterranean formation. In another example, anisotropic wear resistance may relate to a direction substantially corresponding to a helix angle associated with the motion of the abrasive-impregnated cutting structure as it is carried by a drag bit during drilling. Also, the anisotropic wear resistance may be configured for forming or retaining a formation-engaging leading edge in response to cutting engagement with the subterranean formation. Alternatively or additionally, the anisotropic wear resistance may relate to an anticipated wear direction.

The present invention also relates to a rotary drag bit employing at least one abrasive-impregnated cutting structure according to the present invention. Further, the wear resistance of the at least one abrasive-impregnated cutting structure may increase substantially in proportion to a radial distance thereof from a longitudinal axis of a rotary drag bit.

DETAILED DESCRIPTION OF THE INVENTION

The present invention relates to abrasive-impregnated cutting structures for use in rotary drag bits for drilling subterranean formations.

Figure 1A:
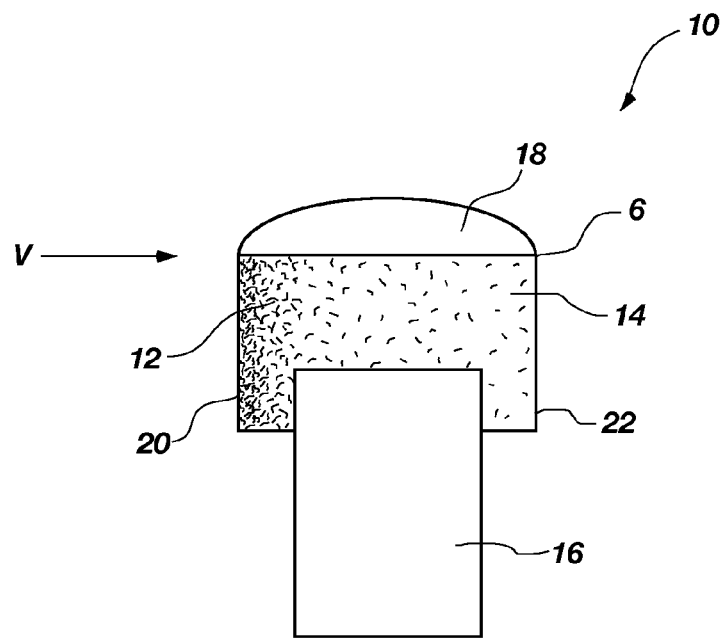
FIG. 1A illustrates a perspective view of a cross-sectioned abrasive-impregnated cutting structure according to the present invention.

Referring now to FIG. 1A of the drawings, a first embodiment of an abrasive-impregnated cutting structure 10, shown in the form of a cross-sectioned generally cylindrical cutting element 6 disposed on a support element 16, of the present invention is depicted in a perspective side view, the abrasive-impregnated cutting structure 10 including abrasive particles 12 dispersed within substantially continuous matrix 14. It should be appreciated that a cutting element 6 may be disposed upon a support element 16 or may be formed integrally with a rotary drag bit or may be attached to a rotary drag bit by way of any structure or configuration known in the art, without limitation.

Direction v illustrates an expected direction of engagement of generally cylindrical cutting element 6 with a subterranean formation. Surface 18 may generally represent an engagement surface (either initial or worn) for engaging against a subterranean formation. As described in more detail hereinbelow, direction v may be a function of the drilling conditions. Further, it should be understood that as the generally cylindrical cutting element 6 wears away during use (i.e., drilling a subterranean formation), direction v may change therewith.

According to the present invention, generally cylindrical cutting element 6 may be configured to exhibit anisotropic wear resistance with respect to direction v. "Anisotropic wear resistance," as used herein, means a wear resistance that varies substantially continuously within a body with respect to at least one direction (in reference to a fixed reference system). For instance, referring to FIG. 1A, moving from a point lying upon side extent 20 in direction v, a wear resistance of the body of generally cylindrical cutting element 6, if measured in relation to individual relatively small regions of abrasive particles 12 dispersed within substantially continuous matrix 14, may vary therein, with respect to direction v. In contrast, for comparison only, along side extent 20 (substantially perpendicular to direction v) of generally cylindrical cutting element 6, the wear resistance thereof may be substantially constant. More particularly, a wear resistance of abrasive-impregnated cutting structure 10 may decrease with respect to direction v.

Accordingly, abrasive particles 12 within substantially continuous matrix 14 may vary in at least one of concentration, properties, orientation, composition, strength (e.g., a tensile stress at failure or a compressive stress at failure), shape, and size in relation to direction v. Thus, the wear resistance of generally cylindrical cutting element 6 may change in relation to a direction of a fixed reference system. More particularly, the wear resistance may be increasing or decreasing at any given point (in relation to an adjacent point) within generally cylindrical cutting element 6 with respect to a selected direction of a fixed reference system.

Generally, abrasive particles 12 may comprise synthetic diamond grit, natural diamond grit, cubic boron nitride, silicon nitride, cubic boron nitride, silicon carbide, tungsten carbide, or mixtures thereof. Exemplary synthetic diamond grit may be commercially available from Element Six of Shannon, Ireland. Exemplary tungsten carbide material may comprise relatively fine-grain tungsten carbide powder, such as, for example, tungsten carbide powder designated by "DM2001," which is commercially available from Kennametal Inc., of Latrobe, Pa. Substantially continuous matrix 14 may preferably comprise one or more of copper, a copper-based alloy, nickel, a nickel-based alloy, cobalt, a cobalt-based alloy, iron, an iron-based alloy, silver, or a silver-based alloy.

Additionally, the abrasive particles 12 may include a coating disposed thereon. Such a configuration may facilitate retention of the abrasive particles 12 disposed within substantially continuous matrix 14. For instance, such a configuration may increase a so-called "pull-out strength" of the abrasive particles disposed in substantially continuous matrix 14. For instance, a coating disposed on the abrasive particles 12 may comprise at least one metal selected from Groups IVA, VA, VIA of the periodic chart or alloys thereof. For example, abrasive particles 12 may be coated with tungsten, nickel, copper, titanium, or combinations thereof (e.g., in layers or as otherwise known in the art). Alternatively, a coating may comprise a coating as known in the art. For example, U.S. Pat. Nos. 5,024,680, 5,224,969, and 5,011,514, the disclosure of each of which is incorporated by reference herein, disclose examples of conventional coatings that may be applied to abrasive particles 12. Such a coating or coatings may improve adhesion of the substantially continuous matrix to the abrasive particle, may improve retention of the abrasive particle within the substantially continuous matrix, or both.

Figure 1B:
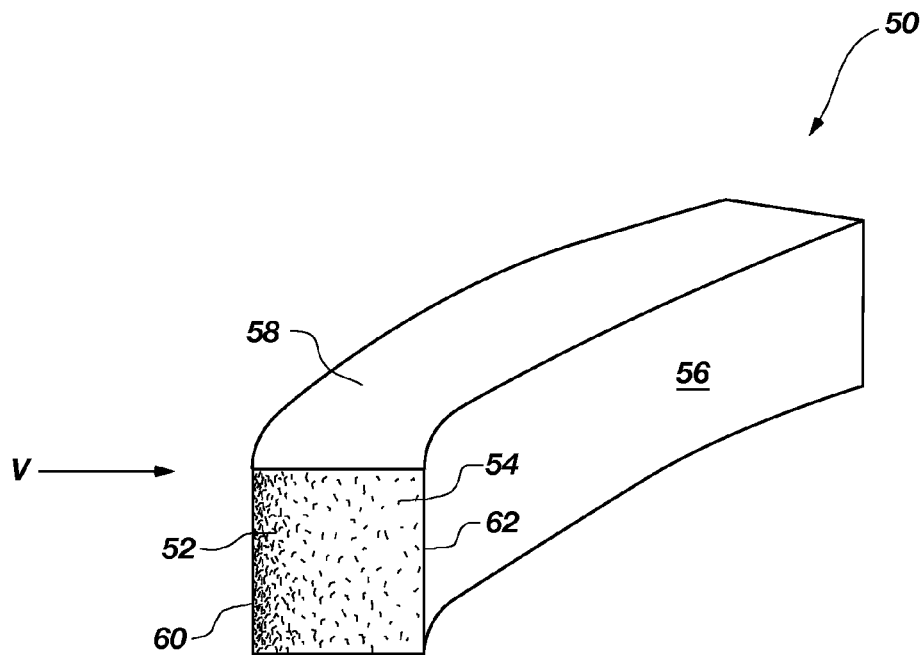
FIG. 1B illustrates a perspective view of an impregnated segment with a cross-sectioned end according to the present invention.

A second embodiment of an abrasive-impregnated cutting structure 50 of the present invention is shown in the form of segment 56, in a perspective side view, showing a cross-sectioned end thereof in FIG. 1B, wherein segment 56 includes abrasive particles 52 dispersed within substantially continuous matrix 54. As explained above, direction v illustrates an expected direction of engagement of abrasive-impregnated cutting structure 50 with a subterranean formation. Put another way, direction v shows a direction in which the subterranean formation may pass along upper surface 58 of segment 56. Accordingly, abrasive particles 52 may vary in concentration, orientation, strength, composition, properties, shape, or size in relation to the distance from side extent 60 of segment 56 with respect to direction v. For example, abrasive particles 52 may substantially continuously vary in concentration, composition, properties, shape, strength, or size in relation to the distance from side extent 60 of segment 56 with respect to direction v. Thus, abrasive-impregnated cutting structure 50 may exhibit anisotropic wear resistance, which substantially continuously varies in relation to a distance from side extent 60 along direction v.

Thus, abrasive-impregnated cutting structures 10 and 50 (FIGS. 1A and 1B) of the present invention may exhibit anisotropic wear resistance in relation to a fixed reference system, such as a reference surface, a reference plane, or a reference point. In one embodiment, the abrasive particles 12 and 52 may be non-uniformly distributed within substantially continuous matrix 14. Generally, a concentration of abrasive particles 12 and 52 is shown as decreasing with respect to direction v from side extents 20 and 60 toward side extents 22 and 62, respectively. However, although FIGS. 1A and 1B depict a decreasing concentration of abrasive particles 12 and 52 along direction v, from side extent 20 and 60, respectively, the present invention is not so limited. Rather, a concentration of abrasive particles 12 and 52 within substantially continuous matrix 14 may decrease or increase at any given point (in relation to an adjacent point) along direction v from side extent 20 and 60, respectively.

The present invention also contemplates other configurations of an abrasive-impregnated cutting structure that exhibit wear resistance anisotropy besides those having varying abrasive particle size, concentration, strength, orientation, or combinations thereof within an abrasive-impregnated cutting structure.

Figure 1C:
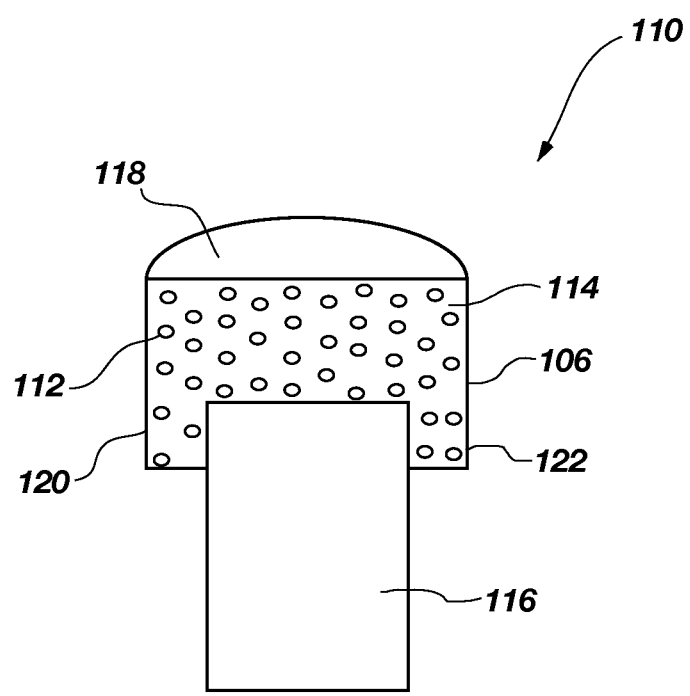
FIG. 1C illustrates a perspective view of another embodiment of a cross-sectioned abrasive-impregnated cutting structure according to the present invention.

For instance, FIG. 1C shows a perspective view of another embodiment of a cross-sectioned abrasive-impregnated cutting structure 110 including upper surface 118 and side extents 120 and 122 according to the present invention. Abrasive-impregnated cutting structure 110, shown as a generally cylindrical cutting element 106 disposed on support element 116 in FIG. 1C includes abrasive particles 112, which may be substantially uniformly dispersed throughout substantially continuous matrix 114, and may be of a substantially similar or equal size, but yet may be structured to produce anisotropic wear resistance of cutting element 106. However, at least one inherent quality related to wear resistance of abrasive particles 112 may vary or change in relation to direction v. Thus, substantially uniformly dispersed abrasive particles 112 may be configured to cause the generally cylindrical cutting element 106 to exhibit anisotropic wear resistance.

As mentioned above, abrasive particles 12, 52, 112 (FIGS. 1A, 1B, and 1C) may preferably comprise a hard, abrasive and abrasion-resistant material, such as, for instance, a superabrasive material. Abrasive particles 12, 52, or 112 may each comprise natural diamond, synthetic diamond, cubic boron nitride, tungsten carbide, or combinations thereof. Thus, an abrasive-impregnated cutting structure according to the present invention may include more than one type of abrasive particle, as well as one or more sizes or quality grades of abrasive particles.

As described above in relation to conventional cutting structures, an abrasive-impregnated cutting structure of the present invention may be cast integrally with the body of a drag bit, as by low-pressure infiltration within a mold, as known in the art. Alternatively, an abrasive-impregnated cutting structure of the present invention may be preformed or fabricated separately and then brazed or welded to the body of a drag bit. Powders comprising abrasive material, matrix material, or both, may be mixed and preferentially segregated or preferentially distributed by the force of earthly gravity in combination with differences in density, and, optionally facilitated by vibration. Under such a force of segregation, or another force for segregating powders, as known in the art, abrasive particles may be distributed in a desired configuration. Alternatively or additionally, a magnetic field may be used for preferentially segregating or distributing the abrasive particles, wherein the abrasive particles comprise a magnetic material. Once a desired distribution of abrasive particles is achieved, an impregnated cutting structure may be pre-pressed or prefabricated (e.g., infiltrated, exposed to high-pressure isostatic pressure, or otherwise infiltrated) for incorporation within a rotary drag bit in the future.

In a further alternative for segregating abrasive particles, so-called hand packing, as known in the art, or layering may effectively form a gradient of abrasive particles. Similarly, prefabricated sheets or layers of abrasive impregnated materials (e.g., abrasive particles within a volatile binder) may be positioned adjacent one another to effectively form a substantially continuous gradient of at least one abrasive property in the direction of layering. Alternatively, particles, such as abrasive particles, particles to form a substantially continuous matrix, or both may be sprayed (along with a removable binder material, such as wax or a polymer) into a mold employed for forming a rotary drag bit. Optionally, robotic control of the spraying or of placement of prefabricated impregnated cutting structures may be employed for positioning thereof within a mold for fabricating a rotary drag bit.

In yet a further alternative, a so-called "Selective Laser Sintering" process may be employed for forming an impregnated cutting structure. The selective laser sintering process creates solid three-dimensional objects, layer-by-layer, from plastic, metal, diamond, cermets, or ceramic powders that are "sintered" or fused using $CO_2$ laser energy. The inherent materials versatility of SLS technology allows a broad range of advanced rapid prototyping and manufacturing applications to be addressed. The powders may be subsequently infiltrated with another compatible material, such as a molten metal, polymer, or other suitable infiltrant.

Also as mentioned above, the material of the substantially continuous matrix may be chosen for wettability, mechanical properties, such as abrasion resistance, or both, and may comprise one or more of copper, a copper-based alloy, nickel, a nickel-based alloy, cobalt, a cobalt-based alloy, iron, an iron-based alloy, silver, or a silver-based alloy. It should be understood that the substantially continuous matrix may comprise different constituents or compositions. For instance, a first substantially continuous matrix material may be melted in and around a first portion of abrasive particles, while a second substantially continuous matrix material may be melted into a second portion of abrasive particles, where the first and second section of abrasive particles abut one another. Thus, the first material may join directly to the second material, alloy therewith, or otherwise become mechanically continuous therewith. Such a configuration may provide a substantially continuous matrix according to the present invention.

Generally, the present invention encompasses an abrasive-impregnated cutting structure having an anisotropic wear resistance with respect to a selected direction. In one embodiment of the present invention, a wear resistance of an abrasive-impregnated cutting structure may be structured for anisotropy with respect to a selected direction substantially corresponding to a helix angle associated with the motion of the abrasive-impregnated cutting structure as it is carried by a drag bit during drilling. As known in the art, cutting structures positioned upon a rotary drag bit travel along helical paths as the bit rotates and moves longitudinally, drilling ahead into the formation. A helix angle may be determined by a radial position of a cutting structure on the bit, a rate-of-penetration ("ROP"), and a rotational speed of the cutting structure during drilling. Therefore, a helix angle associated with an abrasive-impregnated cutting structure may be determined according to its position and the expected rate of penetration and rotational speed of the drag bit during use. According to the present invention, an abrasive-impregnated cutting structure may be configured for exhibiting anisotropic wear resistance with respect to an associated helix angle. More particularly, a cutting structure of the present invention may exhibit anisotropic wear resistance with respect to a predicted or anticipated helix angle associated therewith.

Figure 2A:
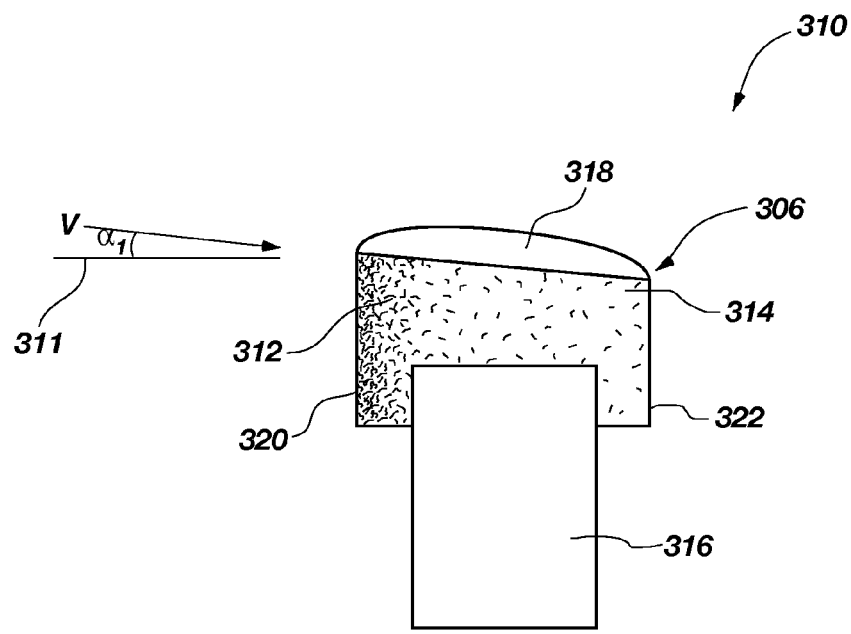
FIG. 2A illustrates a perspective view of a worn, cross-sectioned abrasive-impregnated cutting structure according to the present invention.
Figure 2C:
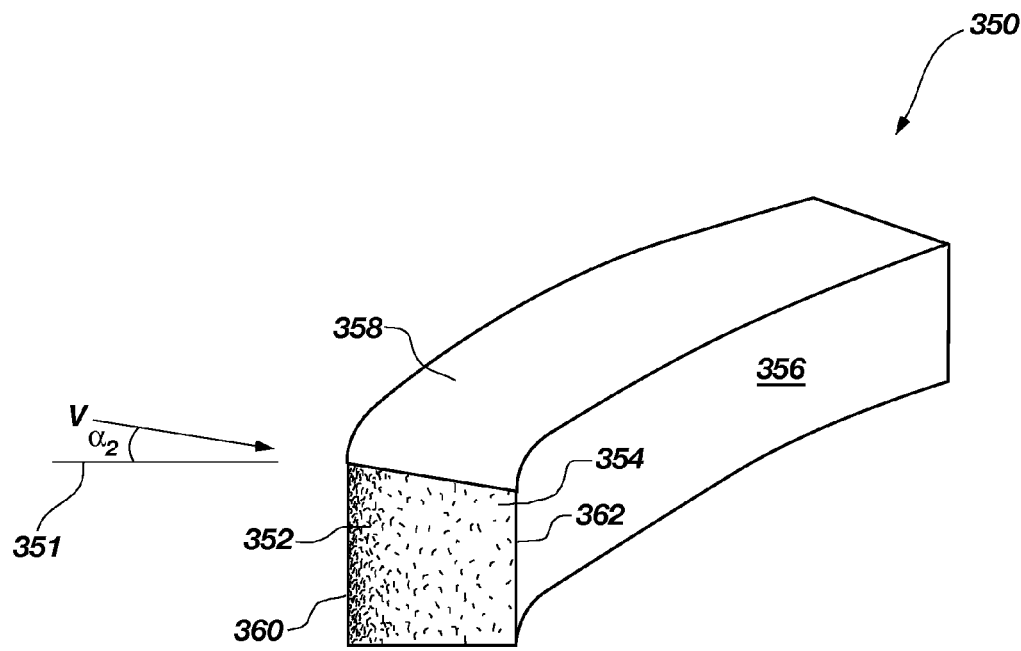
FIG. 2C illustrates a perspective view of a worn, impregnated segment with a cross-sectioned end according to the present invention.
Figure 2B:
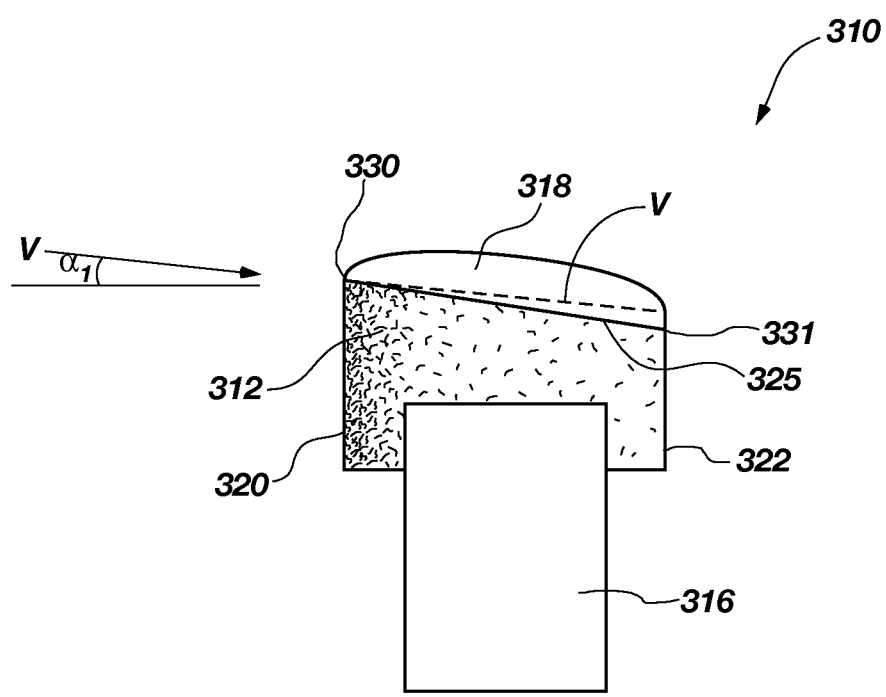
FIG. 2B illustrates a perspective view of a worn, cross-sectioned abrasive-impregnated cutting structure according to the present invention.

In one embodiment of the present invention, turning to FIGS. 2A-2C, FIG. 2A illustrates a perspective side view of a cross-sectioned, worn, abrasive-impregnated cutting structure 310 including generally cylindrical cutting element 306 disposed upon support element 316, wherein generally cylindrical cutting element 306 comprises abrasive particles 312 dispersed within substantially continuous matrix 314. Cylindrical cutting element 306 may be configured according to any of the above embodiments of abrasive-impregnated cutting structure 10, 50 and 110 described above.

Impregnated cutting structure 310 is shown as having been worn by a subterranean formation by relative movement of upper surface 318 of generally cylindrical cutting element 306 in direction v, oriented at a helix angle $\alpha_1$. Helix angle $\alpha_1$ is shown in relation to reference plane 311, which may be oriented substantially perpendicular to a longitudinal direction of drilling (i.e., the longitudinal axis or rotational axis of the drag bit). Thus, FIG. 2A shows that generally cylindrical cutting element 306 may be worn from an initial substantially cylindrical geometry (FIGS. 1A, 1C) to a partially generally cylindrical shape forming, in part, upper surface 318, which may have a topography which is substantially parallel to helix angle $\alpha_1$.

Further, abrasive-impregnated cutting structure 310 may exhibit anisotropic wear resistance with respect to direction v. For instance, a wear resistance of abrasive-impregnated cutting structure may decrease in relation to a distance from side extent 320 toward side extent 322 along direction v.

In further detail, structuring a wear resistance of abrasive-impregnated cutting structure 310 to decrease in relation to a distance from side extent 320, along direction v, may be desirable for producing cutting "clearance." As shown in FIG. 2B, engagement between abrasive-impregnated cutting structure 310 and a subterranean formation (not shown) may form upper boundary 325, which varies from the intersection of direction v with cutting structure 310. Because the wear resistance decreases along direction v, drilling contact with a subterranean formation may cause greater wearing toward rotationally following edge 331, in relation to leading edge 330. The difference between direction v and upper boundary 325 may be termed the "clearance." Such a configuration may improve the efficiency of drilling with the cutting structure by preferentially generating or retaining a formation-engaging leading edge 330. Thus, the amount of wear exhibited by abrasive-impregnated cutting structure 310 may vary in relation to a distance from side extent 320.

In this way, anisotropic wear resistance may be tailored to form a "self-sharpening" geometry. "Self-sharpening," as used herein, refers to a configuration wherein a leading edge of a cutting structure, in relation to a direction of movement against a subterranean formation, is preferentially formed or retained. As may be seen in FIG. 2A, the leading edge proximate to the intersection of side extent 320 and upper surface 318 may be preferentially retained, by exhibiting greater wear resistance than the wear resistance of other portions of generally cylindrical cutting element 306.

It should be recognized that the clearance depicted in FIG. 2B may imply a linearly varying wear resistance. However, the present invention is not so limited. Rather, the wear resistance of an abrasive-impregnated cutting structure of the present invention may be structured for producing a desired clearance having desired characteristics. It should also be noted that although the embodiments shown in FIGS. 2A-2C generally refer to a wear resistance that decreases along direction v, the present invention generally encompasses an abrasive-impregnated cutting structure having a wear resistance that varies with respect to direction v; thus, an abrasive-impregnated cutting structure may include regions wherein each region exhibits a wear resistance that is increasing or decreasing.

Further, FIG. 2C shows segment 356 including abrasive particles 352 and substantially continuous matrix 354, wherein segment 356, particularly abrasive particles 352 dispersed within substantially continuous matrix 354, may be configured according to any of the above embodiments of abrasive-impregnated cutting structures 10, 50, and 110 described above. Segment 356 is shown as having been worn by relative movement of worn upper surface 358 of segment 356 in direction v, oriented at a helix angle $\alpha_2$, wherein helix angle $\alpha_2$ is shown in relation to reference plane 351, which is oriented substantially perpendicular to a longitudinal direction of drilling (i.e., the longitudinal axis or rotational axis of the drag bit). More specifically, segment 356 may have been worn from an initial substantially rectangular geometry (FIG. 1B) to a partially generally rectangular or trapezoidal shape forming, in part, worn upper surface 358, which is oriented substantially at helix angle $\alpha_2$.

Further, abrasive-impregnated cutting structure 350 may exhibit anisotropic wear resistance with respect to direction v. For instance, a wear resistance of abrasive-impregnated cutting structure 350 may decrease with respect to direction v from side extent 360 toward side extent 362. Configuring the wear resistance of abrasive-impregnated cutting structure 350 to decrease in relation to a distance from side extent 360, along direction v, may be desirable for producing cutting "clearance," as described above in relation to FIG. 2B. Thus, the amount of wear exhibited by segment 356 in response to cutting interaction with a subterranean formation may be proportional to a distance from side extent 360 along direction v.

Figure 3A:
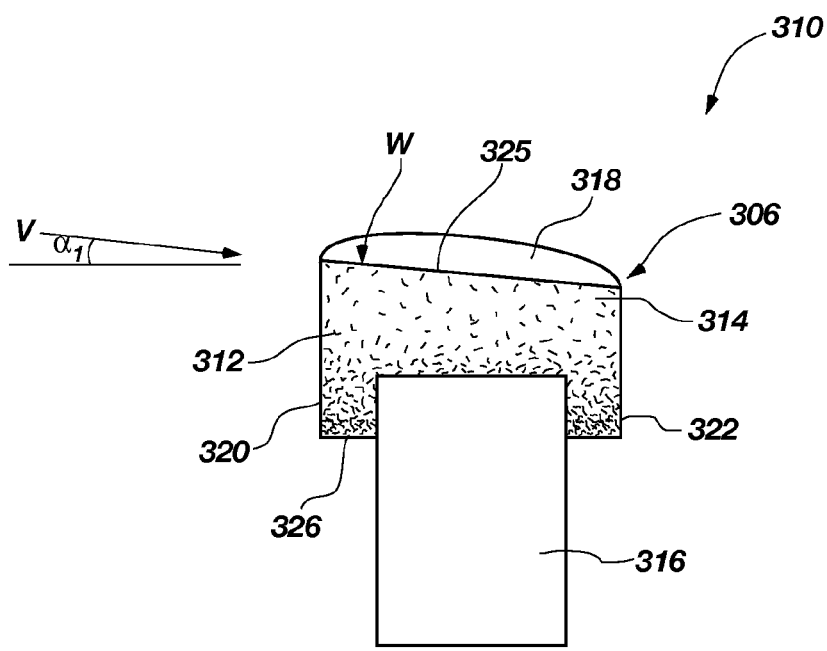
FIG. 3A illustrates a perspective view of a cross-sectioned abrasive-impregnated cutting structure according to the present invention.
Figure 3B:
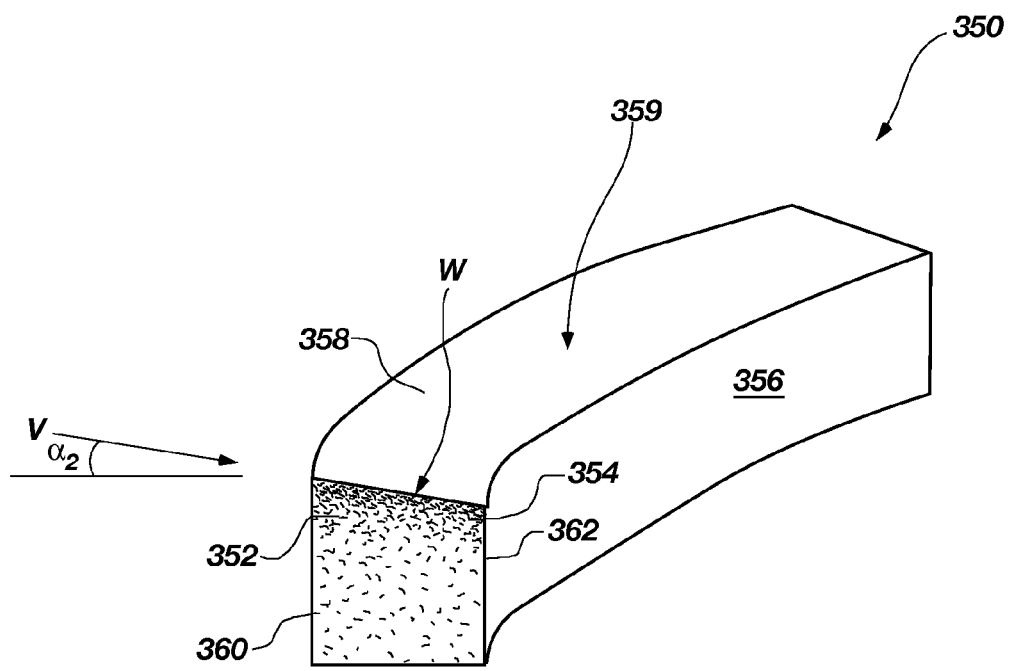
FIG. 3B illustrates a perspective view of an impregnated segment with a cross-sectioned end according to the present invention.

In a further aspect of the present invention, the wear resistance of an abrasive-impregnated cutting structure may vary with respect to an anticipated direction of wear. Particularly, FIGS. 3A and 3B show abrasive-impregnated cutting structures 310 and 350 generally as shown in FIGS. 2A and 2C, respectively, however, the wear resistance thereof may vary with respect to an anticipated wear direction, w. In further detail, anticipated wear direction w may be the direction of the chronological change in shape (i.e., shrinkage) of abrasive-impregnated cutting structure 310 in response to cutting or drilling contact with a subterranean formation.

For instance, if abrasive-impregnated cutting structure 310 wears to form an upper surface 318 that is substantially parallel to direction v, an anticipated wear direction w may be substantially perpendicular thereto. As shown in FIG. 3A, generally cylindrical cutting element 306 may be configured with a wear resistance which increases from upper boundary 325 with respect to (i.e., in the direction of) anticipated wear direction w toward lower boundary 326. Similarly, as shown in FIG. 3B, segment 356 may be configured with a wear resistance that increases from upper edge 359 with respect to (i.e., in the direction of) anticipated wear direction w.

In a further aspect of the present invention, a chronological progression of wear of an abrasive-impregnated cutting structure in response to drilling contact with an expected subterranean formation may be predicted by simulation, modeling, prediction, or empirical observation. The chronological progression of cutting structure wear may indicate an anticipated wear surface with respect to the cutting structure.

Accordingly, the predicted direction of wear may be used for structuring of an anisotropic wear characteristic of an abrasive-impregnated cutting structure for use on a rotary drag bit.

Further, the wear resistance anisotropy of an abrasive-impregnated cutting structure may be selected with respect to the subterranean formation that the drag bit upon which it is carried is intended for drilling through. For instance, such a configuration may cause the abrasive-impregnated cutting structure to become, via wearing, more or less aggressive. Further, combination of varying wear resistance as well as varying geometry (e.g., tapered or otherwise changing geometry) by way of wearing of an abrasive-impregnated cutting structure may result in an abrasive-impregnated cutting structure that becomes, via wearing, more suitable for drilling through different subterranean formations substantially as they may be encountered.

In one example, a relatively non-aggressive but relatively wear resistant abrasive-impregnated cutting structure may drill through a relatively hard subterranean formation, causing wearing of the abrasive-impregnated cutting structure. In turn, such wearing may cause the abrasive-impregnated cutting structure to become more aggressive, by way of, for instance, reducing the contact area between the abrasive-impregnated cutting structure and the subterranean formation. The change in aggressiveness of the abrasive-impregnated cutting structure due to wear thereof may be structured to substantially correspond to a change in the subterranean formation. For example, predictive wear models, simulations, or empirical data may be used to size, position, structure, and select the materials and characteristics of an abrasive-impregnated cutting structure, so that changes in at least one characteristic thereof due to wearing substantially correspond to a change in the subterranean formation (e.g., drilling through shale into sandstone).

Figure 4:
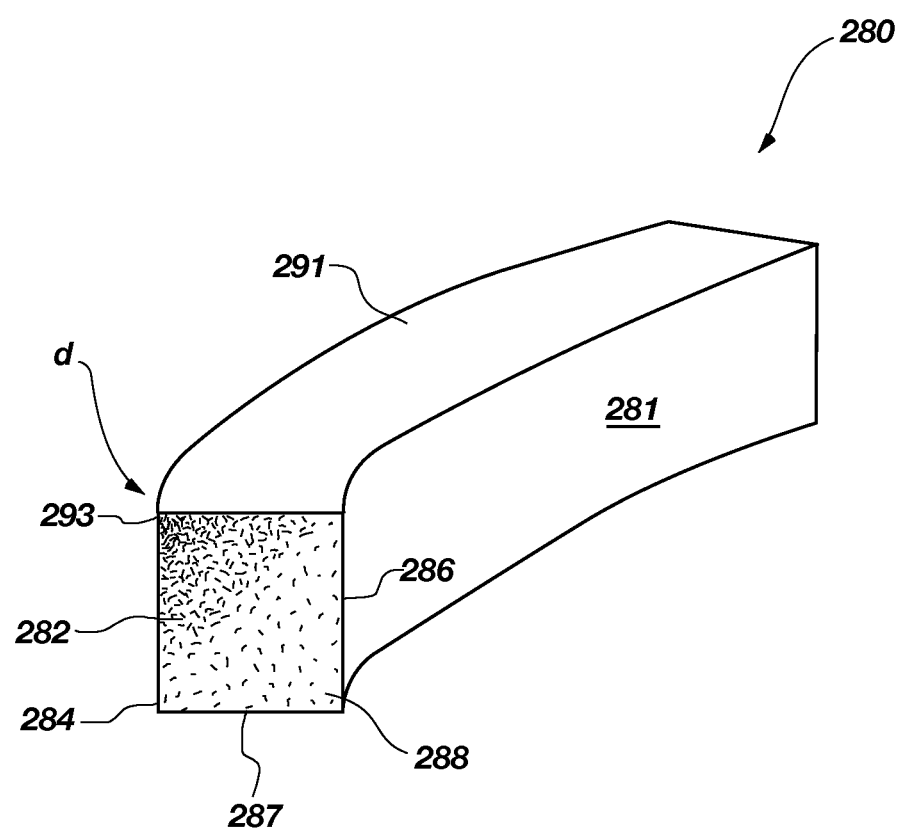
FIG. 4 illustrates a perspective view of an impregnated segment with a cross-sectioned end according to the present invention.

As a further extension of the present invention, an abrasive-impregnated cutting structure according to the present invention may exhibit wear resistance anisotropy with respect to both an anticipated direction of engagement with a subterranean formation (i.e., helix angle associated with an anticipated motion of the abrasive-impregnated cutting structure) and an anticipated direction of wear. Specifically, FIG. 4 shows abrasive-impregnated cutting structure 280, or, more specifically, segment 281, illustrated in a perspective side view, showing a cross-sectioned end thereof wherein the wear resistance of segment 281 varies in relation to direction d from edge 293. Segment 281 includes side extent 284, side extent 286, upper surface 291, and lower surface 287. Segment 281 also comprises abrasive particles 282 dispersed within substantially continuous matrix 288. Abrasive particles 282 are depicted as varying in concentration, composition, strength, characteristics, shape, or size in relation to a distance from edge 293 along direction d. Direction d may be a vector combination of an anticipated wear direction (w, as shown in FIGS. 3A and 3B) and direction v (oriented substantially at an associated helix angle, as shown in FIGS. 2A-2C). Accordingly, in one embodiment, the wear resistance of segment 281 may be at a maximum at edge 293, and decrease in relation to a distance therefrom along direction d.

Also, it should be noted that a method of manufacturing of an abrasive-impregnated cutting structure of the present invention is encompassed by the present invention. For instance, a mold may be filled with abrasive particles and, optionally, matrix particles and oriented so that a primary segregation direction, a direction with respect to which the abrasive particles may be segregated (e.g., the direction of the force of gravity), is generally aligned with a direction of desired wear resistance anisotropy, such as v, w, or d, as discussed above. The abrasive particles may be held in place by a wax or other binder and subsequently removed from the oriented mold and placed in a drag bit mold for infiltration therewith. Alternatively, the abrasive particles may be infiltrated in the oriented mold and brazed, welded, or otherwise affixed to a rotary drag bit.

In summary, as may be seen from the foregoing examples, many configurations are encompassed by the present invention for varying the wear resistance of an abrasive-impregnated cutting structure. Particularly, an abrasive-impregnated cutting structure according to the present invention may be structured for exhibiting an anisotropic wear resistance with respect to a helix angle, an anticipated wear direction, or a combination thereof. Further, such anisotropic wear resistance may be configured or structured in relation to drilling interaction with an expected subterranean formation or, more specifically, cutting interaction with differing regions thereof.

As may be appreciated by one of ordinary skill in the art, wear resistance of an impregnated cutting structure may be dependent on the conditions under which the wear occurs. Modeling and conceptual theories have been developed regarding wear mechanisms of impregnated cutting structures. For example, a so-called "three-body" abrasion model considers the properties of the substantially continuous matrix, an abrasive particle at least partially suspended within the continuous matrix, and the cuttings of the material to be abraded (i.e., the subterranean formation). Of course, such a model or concept is typically an approximation when compared to the complexity of the actual conditions surrounding wear of an impregnated cutting structure. Some additional factors that may affect the wear behavior of an impregnated cutting structure may include: a distance that an abrasive particle protrudes from the substantially continuous matrix (otherwise termed "exposure"), the speed at which the abrasive particle encounters the subterranean formation, the forces between the abrasive particle and the subterranean formation, and the effectiveness of fluid for cooling the abrasive particles and carrying cuttings of the subterranean formation away from the impregnated cutting structure.

Thus, the direction of engagement and nature of contact between two bodies or materials may influence or determine wear resistance therebetween. Of course, the properties of the materials may also influence or determine wear resistance between two contacting bodies. Therefore, while examples of preferential retention of a formation-engaging leading edge in response to wearing of an abrasive-impregnated cutting structure may be given herein, none of such examples are limiting.

Figure 5A:
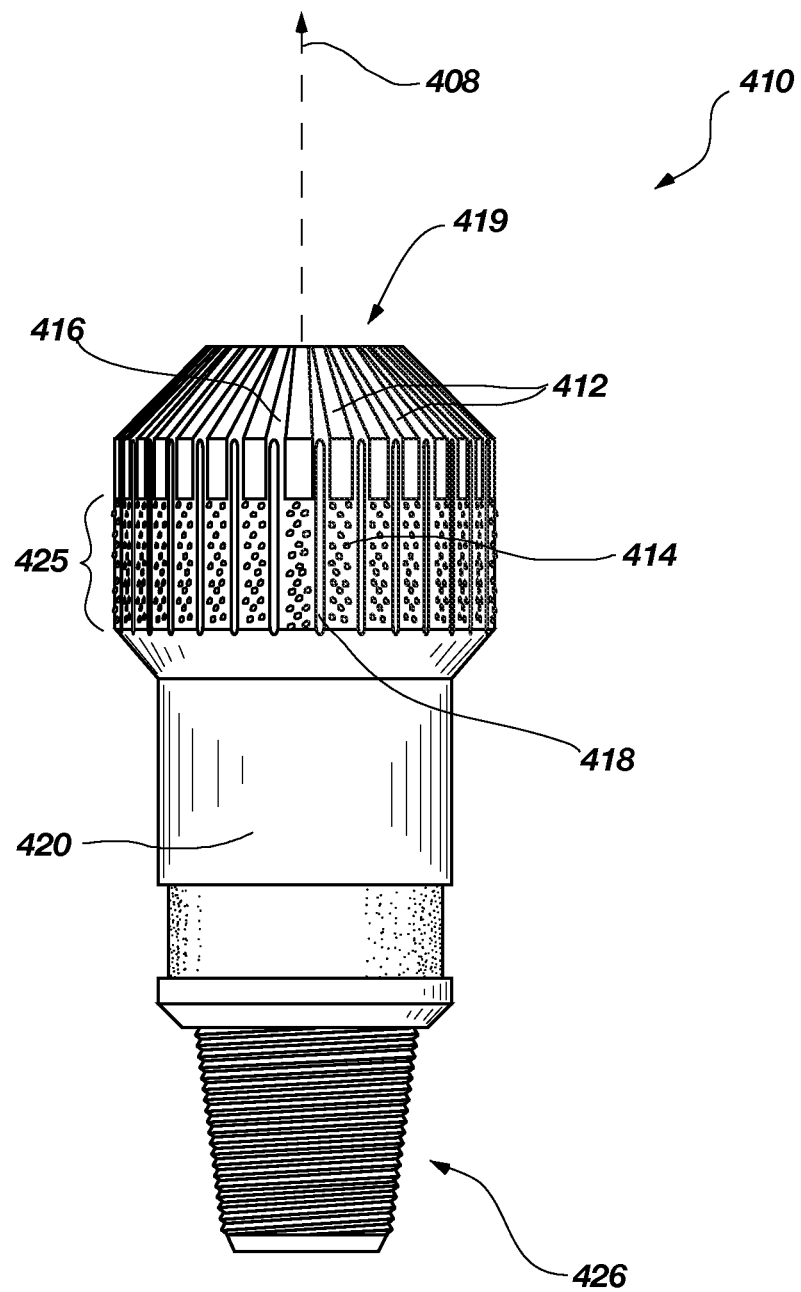
FIG. 5A shows a side perspective view of a rotary drag bit according to the present invention.
Figure 5B:
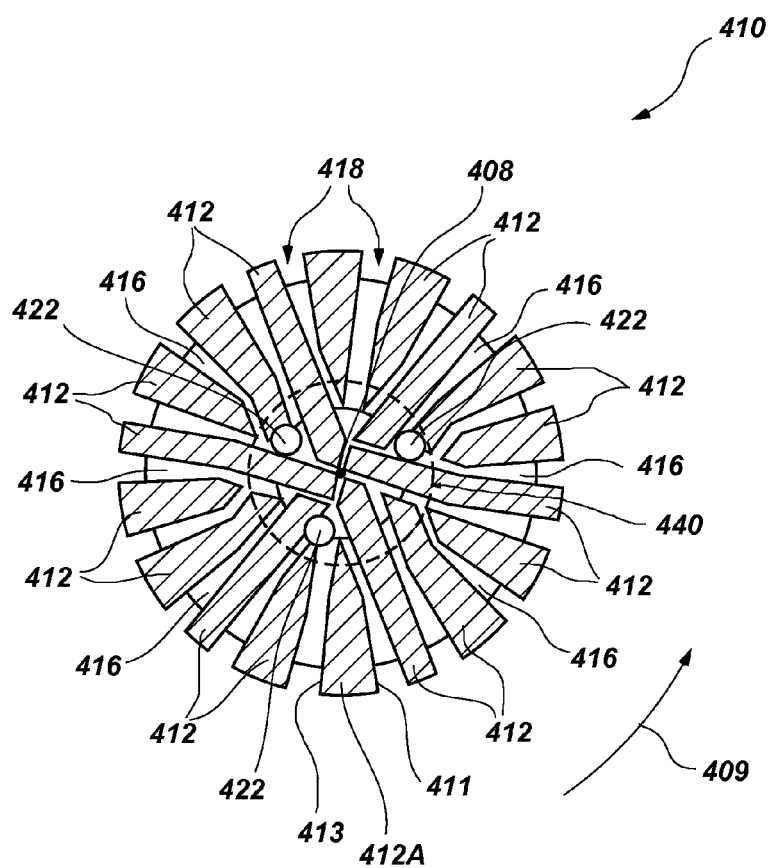
FIG. 5B shows a top elevation view of the rotary drag bit shown in FIG. 5A.

At least one abrasive-impregnated cutting structure of the present invention may be positioned and affixed to a rotary drag bit. For instance, as shown in FIGS. 5A and 5B, showing a perspective side view and a top elevation view of a rotary drag bit 410 of the present invention, respectively. Referring to FIG. 5A, rotary drag bit 410 includes a body 420 and shank 426 for connection to a drill string (not shown), the shank 426 extending therefrom opposite to bit face 419. Each of the plurality of blades 412 extend generally radially outwardly with respect to longitudinal axis 408 to a gage region 425. Also, both fluid courses 416 extend to junk slots 418 formed between circumferentially adjacent blades 412. Gage regions 425 may include natural diamonds 414, but may also include, additionally or alternatively, at least one of synthetic diamond and cemented tungsten carbide, wherein the cemented tungsten carbide may be in the form of "bricks," as known in the art.

During operation, rotary drag bit 410 may be affixed to a drill string (not shown), rotated about longitudinal axis 408 in direction 409 (FIG. 5B), and may translate along the direction of longitudinal axis 408 into a subterranean formation (not shown), as known in the art. Also, drilling fluid may be communicated through one or more apertures 422 from the interior of rotary drag bit 410 to the face 419 (FIG. 5A) thereof, moving along fluid courses 416, into junk slots 418, and ultimately upwardly within the annulus formed between the drill string and the borehole that is formed by the rotary drag bit 410 during drilling. In this way, cuttings of the formation may be transported within the drilling fluid and the cutting structures on the rotary drag bit 410 may be cooled.

At least a portion of at least one of the plurality of blades 412 of the rotary drag bit 410 may carry or may comprise an abrasive-impregnated cutting structure that exhibits anisotropic wear resistance. Particularly, at least a portion of at least one of the blades 412 comprising an abrasive-impregnated cutting structure may be structured or configured to exhibit an anisotropic wear resistance. Particularly, the blade 412A of blades 412 with labeled leading edge 411 and trailing edge 413 is shown as comprising an abrasive-impregnated cutting structure.

In one embodiment, the amount of wear exhibited by blade 412A may vary from less wear to greater wear in relation to the distance from the leading edge 411 to the trailing edge 413 of a blade 412. Thus, the anisotropic wear resistance may be configured to form a "self-sharpening" geometry, wherein the leading edge 411 of blade 412A is preferentially formed or retained. Optionally, anisotropic wear resistance of blade 412A may be configured to exhibit anisotropy with respect to an anticipated direction of wear, as discussed above.

Although the anisotropic wear resistance may be configured to vary in relation to the path that is traversed by the formation at a position along the leading edge 411 to the trailing edge 413 of blade 412A, which would be generally circular and opposite to the direction of rotation 409, such correspondence to the direction of cutting is not required. Rather, the wear resistance may vary (exhibit anisotropy) along a curved or straight path from the leading edge 411 to the trailing edge 413 of blade 412A, without limitation. As may be appreciated, there are many different configurations that may cause at least a portion of blade 412A to form a "self-sharpening" geometry, wherein a leading edge 411 is structured or configured to be preferentially formed or retained in response to wearing via contact with a subterranean formation. Further, optionally, the wear resistance of blade 412A may be configured for generating a selected clearance. Additionally or alternatively, the wear resistance of blade 412A may be configured to vary with respect to an anticipated direction of wear.

Figure 5C:
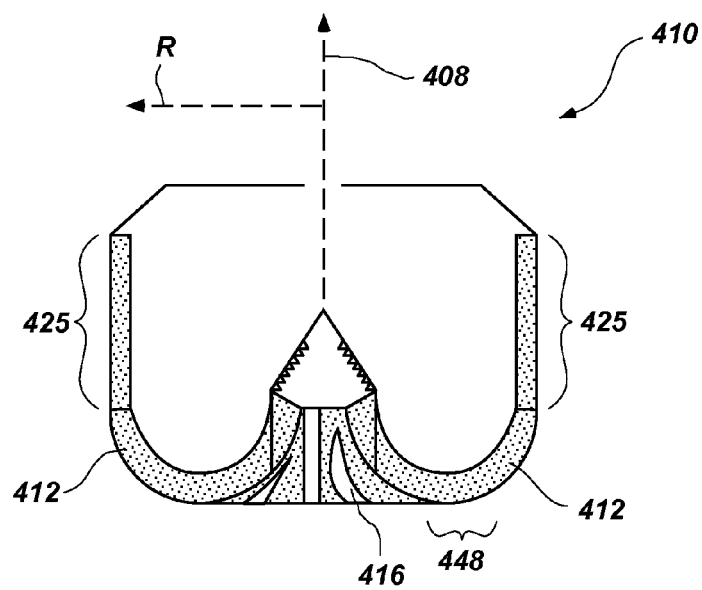
FIG. 5C shows a schematic, partial side view of a rotary drag bit according to one embodiment.

In another aspect of the present invention, the wear resistance of an abrasive-impregnated cutting structure carried by rotary drag bit 410 may be configured according to a region of the rotary drag bit 410. For example, as shown in FIG. 5C, which depicts a schematic, partial side view of rotary drag bit 410, a wear resistance of an abrasive-impregnated cutting structure may be selectively tailored to increase or decrease within a selected region 448 of rotary drag bit 410 with respect to a selected direction. In one embodiment, a wear resistance of an abrasive-impregnated cutting structure may be selectively tailored to increase or decrease within a selected region 448 of rotary drag bit 410 with respect to a radial direction R (i.e., radially away from longitudinal axis 408), as shown in FIG. 5C. Thus, in one embodiment, the wear resistance of an abrasive-impregnated cutting structure carried by rotary drag bit 410 may be configured to increase generally from an outer diameter to a shoulder region of the rotary drag bit 410. Alternatively, a wear resistance may vary in relation to a longitudinal direction (i.e., substantially parallel to longitudinal axis 408).

In a further alternative, a wear resistance of an abrasive-impregnated cutting structure carried by rotary drag bit 410 may be configured according to an amount of formation that is encountered therewith. As may be appreciated, the volume of subterranean formation encountered by a cutting structure may be related to, at least in theory, the size of the imaginary circles that it rotates about, centered about the axis of rotation of the rotary drag bit during use, the imaginary circles superimposed over the face of the rotary drag bit. Thus, as the radial distance from the longitudinal axis of the rotary drag bit increases, the size of such circles increases and so does the volume of the subterranean formation encountered by a cutting structure so positioned. Accordingly, the present invention contemplates that the wear resistance of an abrasive-impregnated cutting structure may be selectively tailored in relation to its radial position on the bit face.

Thus, a wear resistance of an abrasive-impregnated cutting structure according to the present invention may increase substantially in relation to a radial distance from the longitudinal axis of the rotary drag bit 410, because a volume of the subterranean formation removed by a given region thereof is substantially proportional to a square of its radial distance from the longitudinal axis of the rotary drag bit 410. Thus, the concentration, composition, strength, characteristic, shape, or size of abrasive particles may increase as a function of a radial distance from the longitudinal axis of the rotary drag bit 410. Specifically, the amount, average size, or concentration of abrasive particles may increase roughly in proportion to a radial distance from the longitudinal axis, which is related to the amount of subterranean formation that would be removed at a radial position upon the rotary drag bit 410. Alternatively, the wear resistance of the abrasive-impregnated cutting structure may be increased as a function of a radial distance from the longitudinal axis of the rotary drag bit 410. Alternatively or additionally, an inherent quality related to wear resistance may increase substantially in proportion to a radial distance from the longitudinal axis of rotary drag bit 410.

Additionally, as the radial distance of the cutting structure increases from the axis about which the rotary drag bit 410 is rotating (ideally the longitudinal axis 408), the volume, depth of cut, and cutting speed in relation to the subterranean formation that is encountered and removed therewith for a given longitudinal distance of a subterranean formation drilled by the bit varies. Therefore, it may be advantageous to configure an abrasive-impregnated cutting structure positioned at a radial position or region so that its relative wear (distance of material removed) may be generally equal to or balanced in relation to the relative wear of another abrasive-impregnated cutting structure positioned at a different radial position. Such a configuration, if employed upon the entire abrasive-impregnated cutting structure of a rotary drag bit 410 may be advantageous in reducing the occurrence of so-called "ring-out," which is a term used to describe the condition of a portion of the abrasive-impregnated cutting structure wearing or being damaged to a point to which cutting no longer occurs and occurs prematurely to the remaining cutting structure wearing to about the same amount. Such a configuration may also maintain a substantially congruous profile shape in relation to the initial profile shape as the rotary drag bit wears. Accordingly, in one specific example, a concentration, composition, characteristic, shape, a size, a strength, or an inherent quality related to wear resistance of abrasive particles of an impregnated cutting structure may increase as a function of a square of a radial distance from the longitudinal axis of the rotary drag bit 410. Such a configuration may compensate for the variation of a volume of the subterranean formation removed by a particular region (i.e., a radial position) of the rotary drag bit 410.

In another aspect of the present invention, it may be advantageous to configure an abrasive-impregnated cutting structure to exhibit varying wear resistance in relation to the properties of the formation being encountered. For instance, a first formation may be encountered that is effectively drilled by a first abrasive material within a first substantially continuous matrix, while a second formation may be encountered subsequently that is effectively drilled by a second abrasive material within a second substantially continuous matrix. Therefore, a first impregnated material comprising a first abrasive material and a first substantially continuous matrix may be sized and configured to drill a first section of subterranean formation, while the second impregnated material comprising a second abrasive material within a second substantially continuous matrix may be sized and configured to drill a subsequent, second section of subterranean formation. Of course, additional abrasive-impregnated material configurations corresponding to additional subsequent subterranean formations may be included.

In yet another aspect of the present invention, the abrasive-impregnated cutting structure of a rotary drag bit may be configured with respect to a cutting speed at the radial position on the rotary drag bit. Specifically, within region 440, at radial positions proximate the longitudinal axis 408 of the rotary drag bit 410, the cutting speed may be relatively low, which may allow for relatively slow, sliding contact between the formation and the substantially continuous matrix of an abrasive-impregnated cutting structure, since the speed at which a portion of the rotary drag bit 410 contacts the subterranean formation is equal to, ideally, the radial position of the portion multiplied by the rotational velocity of the rotary drag bit. Therefore, near the longitudinal axis 408 of the rotary drag bit 410 (region 440), the magnitude of cutting speed may be relatively low. Also, local forces on each of the abrasive particles may be higher proximate the longitudinal axis, due to the depth of cut (related to the helix angle) and the speed at which the abrasive particle travels during drilling.

Of course, many other factors may affect a wearing behavior of a portion of an impregnated cutting structure of a rotary drag bit. For example, the number of blades, hydraulic environment, type of formation, and rotary drag bit motion during drilling may affect the wear behavior of a portion of an impregnated cutting structure of a rotary drag bit. Accordingly, configuring an anisotropic wear property of an impregnated cutting structure may be an iterative process that is developed and refined through repeated study of used or "dull" rotary drag bits, or other analysis mechanisms, as known in the art.

According to the present invention, by way of example, it may be advantageous to select an increased particle size of the abrasive material within region 440, so the individual particles thereof may be exposed or protrude from the substantially continuous matrix, instead of wearing substantially evenly therewith. Put another way, larger abrasive material particles within a substantially continuous matrix may be employed in regions of an abrasive-impregnated cutting structure positioned near the longitudinal axis of the rotary drag bit 410, while finer or smaller abrasive material particles may be employed in regions of an abrasive-impregnated cutting structure positioned radially outwardly from region 440. Such a configuration may prevent undesirable friction from relatively slow sliding contact between the formation and a substantially smooth surface of an abrasive-impregnated cutting structure within the region 440 of the rotary drag bit 410 proximate to the longitudinal axis 408 by allowing the protruding abrasive material particles to provide exposure or stand-off between the formation and the substantially continuous matrix of the abrasive-impregnated cutting structure. Of course, the present invention is not limited by the above-described example and an increased particle size of the abrasive material may be exhibited in any selected region (e.g., cone, nose, shoulder, gage, etc.) of a rotary drag bit.

Of course, any of the embodiments of abrasive-impregnated cutting structures described in relation to FIGS. 1A-4 may be employed on a rotary drag bit 410 of the present invention, without limitation. As mentioned above, an abrasive-impregnated cutting structure of the present invention may comprise a discrete, abrasive-impregnated cutting structure, an impregnated segment, or another abrasive-impregnated cutting structure as known in the art.

Figure 6A:
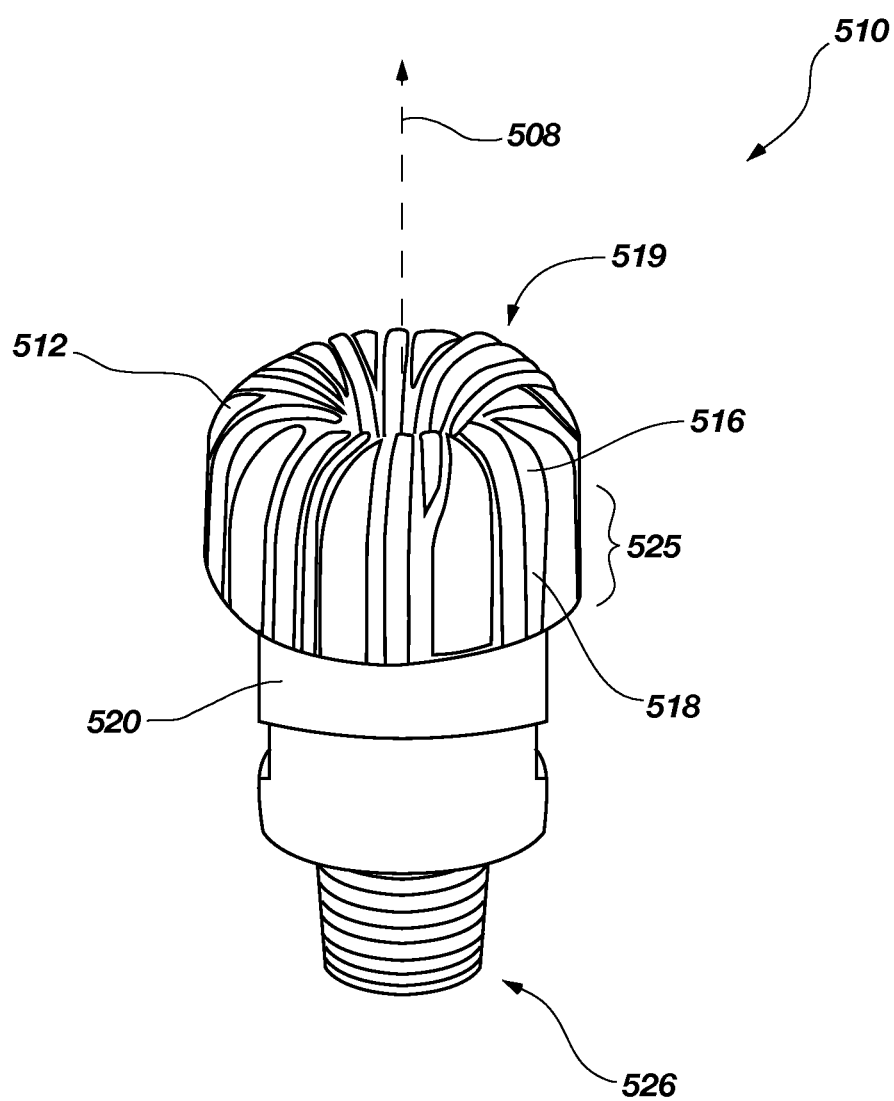
FIG. 6A shows a side perspective view of another rotary drag bit according to the present invention.
Figure 6B:
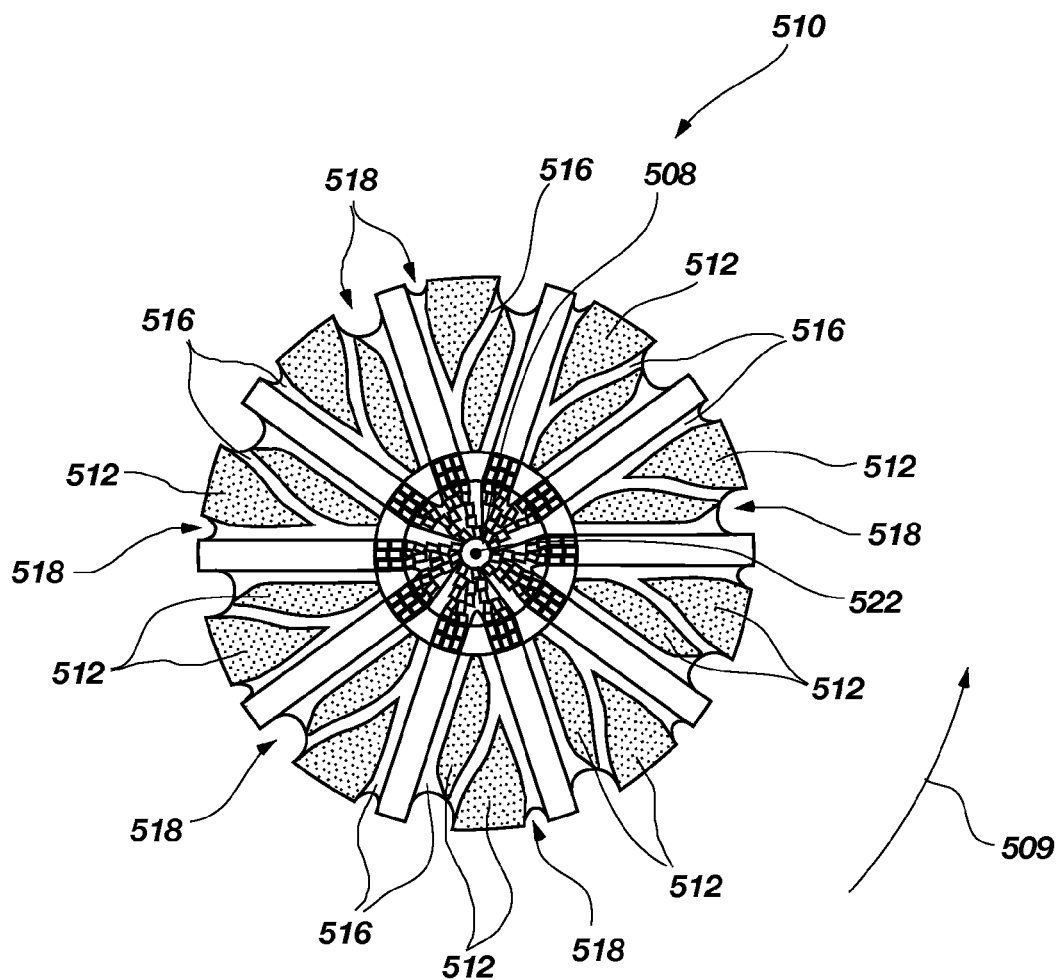
FIG. 6B shows a top elevation view of the rotary drag bit shown in FIG. 6A.

Referring now to FIGS. 6A and 6B, another embodiment of a rotary drag bit 510 of the present invention is shown in a perspective side view and a top elevation view, respectively. Rotary drag bit 510 includes a body 520 and shank 526 for connection to a drill string (not shown). Rotary drag bit 510 further includes a plurality of blades 512 extending generally radially outwardly with respect to longitudinal axis 508 to corresponding gage regions 525. Fluid courses 516 extend to junk slots 518 formed between circumferentially adjacent blades 512.

During operation, rotary drag bit 510 may be affixed to a drill string (not shown), rotated about longitudinal axis 508 in direction 509 (FIG. 6B), and may translate along the direction of longitudinal axis 508 into a subterranean formation (not shown), as known in the art. Also, drilling fluid may be communicated through central aperture 522 from the interior of rotary drag bit 510 to the face 519 (FIG. 6A) thereof, the drilling fluid moving along fluid courses 516, into junk slots 518, and ultimately upwardly within the annulus formed between the drill string and a borehole formed by the rotary drag bit 510 during drilling. Alternatively, rotary drag bit 510 may include more than one aperture for communicating drilling fluid from the interior thereof to the plurality of blades 512 and face 519 thereof. In this way, cuttings of the formation may be transported within the drilling fluid and the cutting structures on the rotary drag bit 510 may be cooled.

Further, at least a portion of at least one of the plurality of blades 512 may comprise an abrasive-impregnated cutting structure of the present invention. As explained above, the abrasive-impregnated cutting structure may comprise many different configurations and may be configured in relation to the subterranean formation to be drilled. In addition, a rotary drag bit according to the present invention is not limited to abrasive-impregnated cutting structures, but may also include polycrystalline diamond cutting elements or thermally stable diamond elements. Such a configuration may provide enhanced operational characteristics during drilling of a subterranean borehole.

Any of the embodiments of abrasive-impregnated cutting structures described in relation to FIGS. 1A-4 may be employed on a rotary drag bit 510 of the present invention, without limitation. As mentioned above, an abrasive-impregnated cutting structure of the present invention may comprise a discrete, abrasive-impregnated cutting structure, an abrasive-impregnated segment, or another abrasive-impregnated cutting structure as known in the art.

Figure 7A:
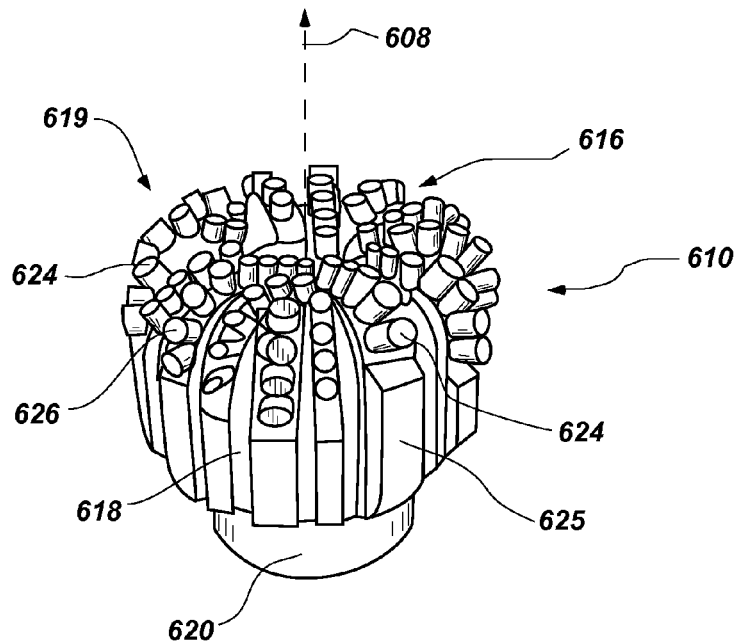
FIG. 7A shows a side perspective view of a further rotary drag bit according to the present invention.
Figure 7B:
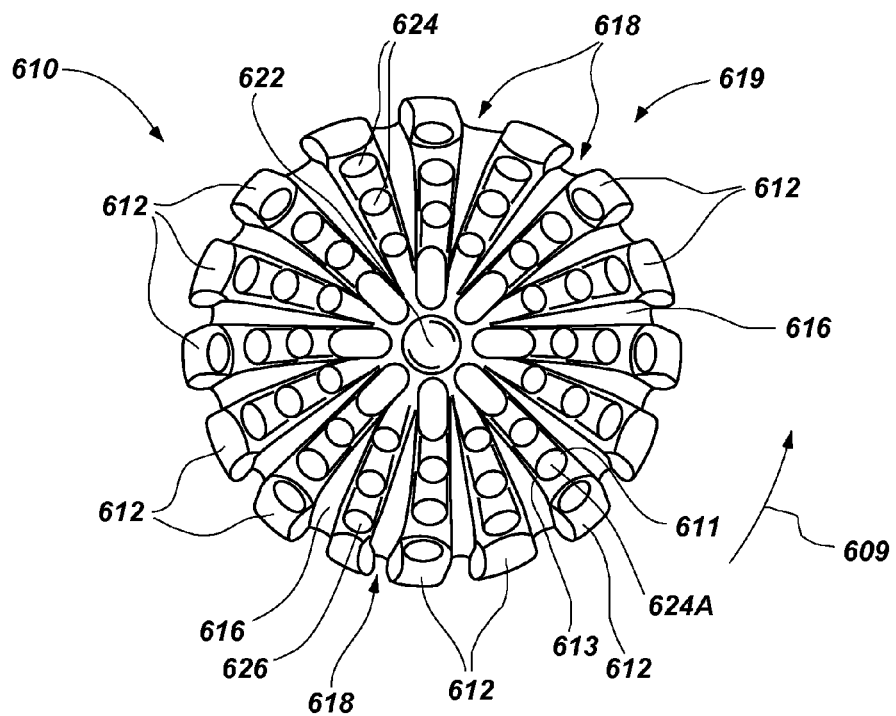
FIG. 7B shows a top elevation view of the rotary drag bit shown in FIG. 7A.

In a further embodiment, an exemplary rotary drag bit 610 of the present invention, as shown in FIGS. 7A and 7B in a perspective side view and a top elevation view, respectively, may include discrete, abrasive-impregnated cutting structures 624, which are formed of impregnated material. Discrete, abrasive-impregnated cutting structures 624 may comprise rotary drag bit 610; accordingly, discrete abrasive-impregnated cutting structures 624 may be formed as a portion of the rotary drag bit 610, as by infiltration therewith, or, alternatively, may be infiltrated, hot pressed, or otherwise fabricated separately and then affixed to the rotary drag bit 610 by brazing or press-fitting, as discussed above. Discrete, abrasive-impregnated cutting structures 624 may be generally shaped with circular outer ends and oval shaped bases, but other geometries are also contemplated. Further, the discrete, abrasive-impregnated cutting structures 624 may comprise a variable or changing cross-section. It is also noted that the spacing between individual discrete, abrasive-impregnated cutting structures 624, as well as the magnitude of the taper from the outer most ends 626 to the blades 612, may be varied to change the overall aggressiveness of the bit 610 as it wears during operation. It is further contemplated that one or more of such discrete, abrasive-impregnated cutting structures 624 may be formed to have substantially constant cross-sections if so desired depending on the anticipated application of the rotary drag bit 610.

Rotary drag bit 610 includes a body 620 and may include a shank (not shown) for connection to a drill string (not shown). Face 619 includes a plurality of blades 612, wherein each of the plurality of blades 612 extend generally radially outwardly with respect to longitudinal axis 608 to a gage region 625. Blades 612, in this embodiment, however, refer to generally radially arranged groups of discrete, abrasive-impregnated cutting structures 624. More generally, discrete, abrasive-impregnated cutting structures 624 may be arranged in concentric or spiral fashion. Fluid courses 616 extend to junk slots 618 formed between circumferentially adjacent blades 612. Accordingly, during operation, rotary drag bit 610 may be affixed to a drill string (not shown), rotated about longitudinal axis 608 in direction 609 (FIG. 7B), and may translate along the direction of longitudinal axis 608 into a subterranean formation (not shown), as known in the art. Contemporaneously, drilling fluid may be communicated through central aperture 622 from the interior of rotary drag bit 610 to the face 619 thereof, moving along fluid courses 616, into junk slots 618, and ultimately upwardly within the annulus formed between the drill string and a borehole formed by the rotary drag bit 610 during drilling. Of course, rotary drag bit 610 may include a plurality of apertures 622 disposed at different positions on face 619 for communicating drilling fluid from the interior thereof to the blades 612 and face 619 thereof for cooling the discrete, abrasive-impregnated cutting structures 624, as well as transporting formation cuttings to the surface of the formation.

Generally, at least one of the abrasive-impregnated cutting structures 624 may be structured or configured to exhibit anisotropic wear resistance. For example, discrete, abrasive-impregnated cutting structure 624A may exhibit anisotropic wear resistance that may be configured to vary in relation to the path that is traversed by the formation at a position along the leading edge 611 to the trailing edge 613, which may be generally circular and opposite to the direction of rotation 609. More generally, the wear resistance of abrasive-impregnated cutting structure 624A may vary or exhibit anisotropy between the leading edge 611 to the trailing edge 613. Accordingly, optionally, discrete, abrasive-impregnated cutting structure 624A may be configured to form a "self-sharpening" geometry, wherein the leading edge 611 is preferentially formed or retained in response to wearing via contact with a subterranean formation. Additionally or alternatively, the wear resistance, geometry, and position of discrete, abrasive-impregnated cutting structure 624A may be configured in relation to expected changes in the subterranean formation, as discussed above regarding other embodiments of the present invention. Further, the wear resistance of abrasive-impregnated cutting structure 624A may vary or exhibit anisotropy with respect to an anticipated direction of wear.

Further, any of the embodiments of abrasive-impregnated cutting structures described in relation to FIGS. 1A-4 may be employed on a rotary drag bit 610 of the present invention, without limitation. As discussed hereinabove, an abrasive-impregnated cutting structure of the present invention may comprise a discrete, abrasive-impregnated cutting structure, an abrasive-impregnated segment, or another abrasive-impregnated cutting structure as known in the art.

Although the foregoing description contains many specifics, these should not be construed as limiting the scope of the present invention, but merely as providing illustrations of some exemplary embodiments. Similarly, other embodiments of the invention may be devised that do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims, are to be embraced thereby.

What is claimed is:

1. An earth-boring drill bit, comprising:
a body comprising a longitudinal axis;
blades extending from a remainder of the body, junk slots being defined between the blades, the blades extending radially from proximate the longitudinal axis to a gage region of the body, the blades extending longitudinally from a leading end of the body toward a trailing end of the body;
a first abrasive-impregnated cutting structure extending along a rotationally leading surface of a first blade; and
a second abrasive-impregnated cutting structure extending along a rotationally leading surface of a second, different blade;
a third abrasive-impregnated cutting structure extending along a rotationally leading surface of a third, different blade;
wherein a first wear resistance of the first abrasive-impregnated cutting structure at a first radial distance from the longitudinal axis is different from a second wear resistance of the second abrasive-impregnated cutting structure at a second, different radial distance from the longitudinal axis; and
wherein a third wear resistance of the third abrasive-impregnated cutting structure at a third distance from the longitudinal axis is different from the first wear resistance and the second wear resistance at the first radial distance and the second radial distance.

2. The earth-boring drill bit of claim 1, wherein the first radial distance is smaller than the second radial distance.

3. The earth-boring drill bit of claim 2, wherein the first wear resistance is less than the second wear resistance.

4. The earth-boring drill bit of claim 3, wherein an average particle size of abrasive particles of the first abrasive-impregnated cutting structure is greater than an average particle size of abrasive particles of the second abrasive-impregnated cutting structure.

5. The earth-boring drill bit of claim 4, wherein the third radial distance is greater than the second radial distance.

6. The earth-boring drill bit of claim 5, wherein the third wear resistance is greater than the first wear resistance and less than the second wear resistance.

7. The earth-boring drill bit of claim 6, wherein an average particle size of abrasive particles of the third abrasive-impregnated cutting structure is less than an average particle size of abrasive particles of the first abrasive-impregnated cutting structure and greater than an average particle size of abrasive particles of the second abrasive-impregnated cutting structure.

8. The earth-boring drill bit of claim 1, wherein the first abrasive-impregnated cutting structure exhibits anisotropic wear resistance, wear resistance of the first abrasive-impregnated cutting structure increasing as radial distance from the longitudinal axis of the body increases.

9. The earth-boring drill bit of claim 8, wherein the wear resistance of the first abrasive-impregnated cutting structure increases at least substantially continuously as radial distance from the longitudinal axis of the body increases.

10. The earth-boring drill bit of claim 1, wherein the second abrasive-impregnated cutting structure exhibits anisotropic wear resistance, wear resistance of the second abrasive-impregnated cutting structure increasing as radial distance from the longitudinal axis of the body increases.

11. The earth-boring drill bit of claim 10, wherein the wear resistance of the second abrasive-impregnated cutting structure increases at least substantially continuously as radial distance from the longitudinal axis of the body increases.

12. An earth-boring drill bit, comprising:
a body comprising a longitudinal axis;
blades extending from a remainder of the body, junk slots being defined between the blades, the blades extending radially from proximate the longitudinal axis to a gage region of the body, the blades extending longitudinally from a leading end of the body toward a trailing end of the body; and
an abrasive-impregnated cutting structure extending along a rotationally leading surface of a blade, the abrasive-impregnated cutting structure exhibiting anisotropic wear resistance;
wherein a first wear resistance of the abrasive-impregnated cutting structure at a first radial distance from the longitudinal axis is different from a second wear resistance of the abrasive-impregnated cutting structure at a second, different radial distance from the longitudinal axis; and
wherein a third wear resistance of the abrasive-impregnated cutting structure at a third distance from the longitudinal axis, the third distance being different from the first radial distance and the second radial distance, the third wear resistance being different from the first wear resistance and the second wear resistance.

13. The earth-boring drill bit of claim 12, wherein the first radial distance is smaller than the second radial distance.

14. The earth-boring drill bit of claim 13, wherein the first wear resistance is less than the second wear resistance.

15. The earth-boring drill bit of claim 14, wherein an average particle size of abrasive particles of the abrasive-impregnated cutting structure at the first radial distance is greater than an average particle size of abrasive particles of the abrasive-impregnated cutting structure at the second radial distance.

16. The earth-boring drill bit of claim 14, wherein a third wear resistance of the abrasive-impregnated cutting structure at a third radial distance from the longitudinal axis is different from the first wear resistance and the second wear resistance, the third radial distance being different from the first radial distance and the second radial distance.

17. The earth-boring drill bit of claim 16, wherein the third radial distance is greater than the second radial distance and the third wear resistance is greater than the first wear resistance and less than the second wear resistance.

18. The earth-boring drill bit of claim 17, wherein an average particle size of abrasive particles of the abrasive-impregnated cutting structure at the third radial distance is less than an average particle size of abrasive particles of the abrasive-impregnated cutting structure at the first radial distance and greater than an average particle size of abrasive particles of the abrasive-impregnated cutting structure at the second radial distance.

19. The earth-boring drill bit of claim 12, wherein wear resistance of the abrasive-impregnated cutting structure increases at least substantially continuously as radial distance from the longitudinal axis of the body increases.

20. The earth-boring drill bit of claim 12, wherein at least one of concentration, composition, strength, shape, and average size of abrasive particles of the abrasive-impregnated cutting structure increases in proportion with radial distance from the longitudinal axis of the body.

21. The earth-boring drill bit of claim 12, wherein wear resistance of the abrasive-impregnated cutting structure increases from the gage region to a shoulder region of the body.

22. An earth-boring drill bit, comprising:
a body comprising a longitudinal axis;
blades extending from a remainder of the body, junk slots being defined between the blades, the blades extending radially from proximate the longitudinal axis to a gage region of the body, the blades extending longitudinally from a leading end of the body toward a trailing end of the body; and
an abrasive-impregnated cutting structure extending along a rotationally leading surface of a blade, the abrasive-impregnated cutting structure exhibiting anisotropic wear resistance;
wherein a wear resistance of the abrasive-impregnated cutting structure decreases in proportion with increasing distance from a leading edge of the abrasive-impregnated cutting structure toward a trailing edge of the blade.

* * * * *